April 30, 1935.     W. W. WILLOUGHBY     1,999,523
CLUTCH
Filed May 29, 1934
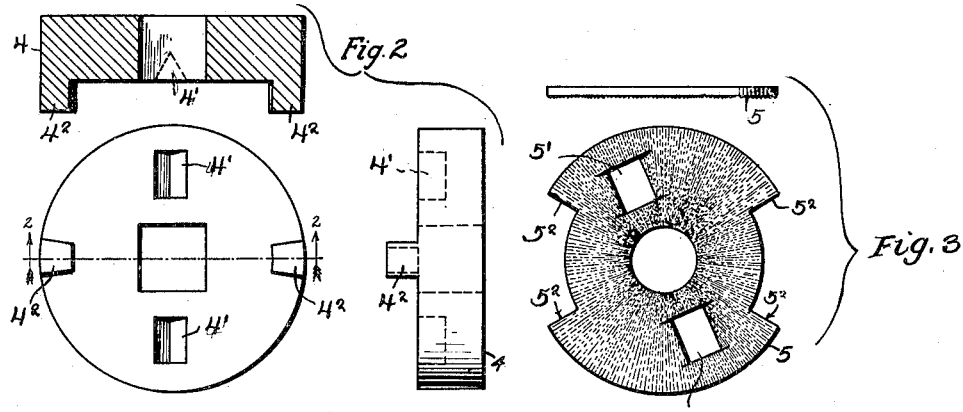
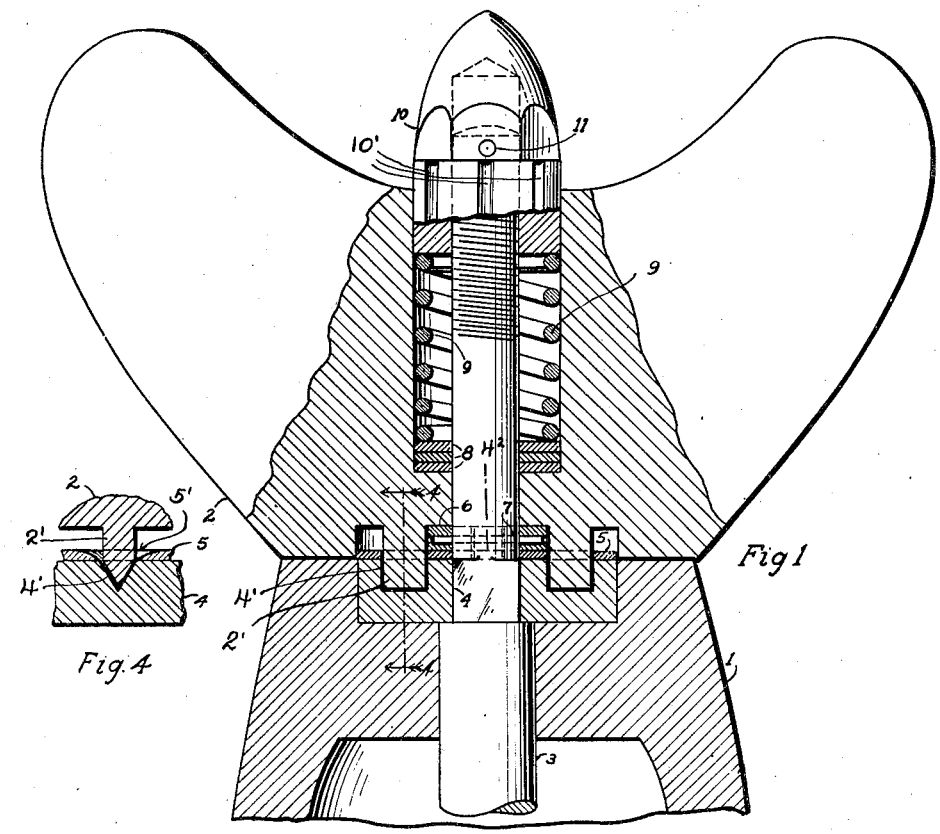
INVENTOR,
William Whetel Willoughby,
BY Davis & Davis,
ATTORNEYS.

Patented Apr. 30, 1935

1,999,523

UNITED STATES PATENT OFFICE 1,999,523

CLUTCH

William Westel Willoughby, Washington, D. C.

Application May 29, 1934, Serial No. 728,153

6 Claims. (Cl. 192—56)

This invention relates to that type of clutches which are adapted to release the driven member from the power source whenever the driven member meets with a predetermined abnormal resistance and to prevent re-engagement of the driven member with the power source until the situation renders it safe to do so, the object of this automatic dis-engagement being to prevent shearing of the usual cotter-pin or other device employed for attaching the driven element to the power-shaft. The object of the present invention is to improve and simplify the mechanism to the extent that the application of my invention to a power driven apparatus will add but little to the manufacturing costs thereof, as more fully hereinafter set forth.

In the drawing attached:

Fig. 1 is a view partly in side elevation and partly in longitudinal section, showing my invention applied to a marine propeller, which is one of the advantageous uses I may make of my invention.

Fig. 2 is a bracketed or group view of the clutch member non-rotatably attached to the driving shaft.

Fig. 3 is a bracketed or group view of the lock-out washer or plate interposed between the two clutch elements to prevent re-engagement of the clutch members after they are dis-engaged by an abnormal resistance.

Fig. 4 is a fragmentary view showing one of the clutch engaging lugs.

Referring to the drawing annexed by reference characters, 1 designates a bearing member for the driving shaft 3. The shaft 3 extends through the bearing member 1 and carries on its outer end the driven member 2, which in the present instance is a marine propeller. Set into a recess in the outer face of the bearing member 1 is a circular clutch member 4 which has its outer face flush with the outer face of the bearing member and is caused to rotate with the propeller shaft by being provided with a central rectangular hole which fits over a similarly-shaped part of the driving shaft. At diametrically opposite points this clutch member 4 is provided with a pair of recesses $4^1$, and at points equidistant the aforesaid recesses this clutch member 4 is provided with outwardly projecting lugs $4^2$.

The driven member 2, as stated, fits on the outer projecting end of the shaft 3, and the face of this driven member adjacent the bearing 1 is provided with a pair of lugs $2^1$ spaced so as to engage and fit into the aforesaid recesses $4^1$, the outer ends of these lugs as well as the side walls of the recesses $4^1$ being inclined so as to form inter-engaging cam faces. The lugs $2^1$ are held normally in engagement with the recesses $4^1$ by means of an expansible coil spring 9 which surrounds the driving shaft, a cylindrical recess being formed in the driven element to provide a housing for this spring. The inner end of this spring presses against a washer or washers 8 located in the bottom of said recess, while its outer end presses against a nut 10 screwed onto the outer threaded end of the driving shaft and having its inner end fitting in the outer end of the housing-recess for the spring. By means of this adjustable nut 10 and the plurality of removable washers 8 any tension desired may be applied to the spring 9 and in that way pre-determine the degree of stress that will release the driven element. After the nut 10 is adjusted to give the desired tension to the spring it is desirably fastened to the propeller shaft by a cotter-pin 11.

Between the two clutch members is arranged a flat disk or plate 5 which in its center is provided with a round hole for the free passage of the driving shaft and which at diametrically opposite points is provided with a pair of recesses 5' through which under normal driving conditions the clutch lugs $2^1$ extend and thus cause this disk or plate to rotate with the driving shaft and both clutch members. To hold this disk 5 rotatively against the outer face of the clutch member 4 I provide a collar 6 and affix the same by a cotter-pin 7 to the driving shaft, this collar 6 being located in an annular recess formed in the body of the driven member 2. At opposite points on the edge of the plate 5 this plate is provided with a pair of arcuate notches, each of which provides a pair of oppositely facing shoulders $5^2$, which when the plate is in position respectively face the opposite faces of the lugs $4^2$. These shoulders $5^2$ in conjunction with the lugs $4^2$ limit the rotation of the disk 5. When the parts are in operative position as shown in Fig. 1, two of the shoulders $5^2$ (the two that are diametrically opposite each other) abut against opposite faces of the lugs $4^2$, so that when the plate 5 is subjected to rotative forces it can rotate only until the other pair of lugs strike against the opposite faces of the lugs $4^2$, thus preventing this plate 5, as stated, having anything but a limited rotative movement.

In operation, when the propeller or other driven element meets with a destructive resistance, the cam faces of the lugs $2^1$ will cause the lugs to ride out of their recesses onto the outer face of the disk 5, thus compressing the spring 9 sufficiently to enable this disengagement to be accomplished. The collar 6 prevents the lockout plate 5 from leaving the face of the clutch member 4. When the lugs 2¹ thus ride out of the recesses 4¹ the driven element 2 will be free to rotate on the driving shaft independently of said shaft, thus preventing destruction of any of the parts. When the clutch members are thus disengaged the extreme ends of the lugs 2¹ will as a result, press against the edges of the holes 5¹ and the outer face of the lock plate, and this pressure will be sufficient to rotate this locking plate far enough in the direction of rotation of the power shaft to cause it to cover the recesses 4¹ and thus prevent the reengagement of the lugs 2¹ with said recesses 4¹, whether or not the driven member 2 continues to rotate by the force of inertia or otherwise upon the driving shaft. To insure this partial rotation of the lockout plate 5 I may roughen or corrugate the outer surface thereof, as shown in Fig. 3, thereby insuring the tapered ends of the lugs 2¹ giving a sufficient grip on the lock plate to insure its quick rotation to covering or lockout position. To reengage the clutch members it is necessary simply to rotate the propeller or other driven member backwardly manually or otherwise a sufficient distance to cause the lockout plate 5 to uncover the recesses 4¹, whereupon the spring 9 will force the clutch pins 2¹ through the holes 5¹ and into the recesses 4¹.

It will be understood that the edges of the openings 5¹ in the lock plate may be rounded off or bevelled to facilitate the dis-engagement of the lugs 2¹ from said holes and also to reduce to a minimum any chattering that might take place by the continued rotation of the driven element after it has been released. It will be understood of course that without departing from my invention the parts may be reversed, that is, the parts carried by the driven member of the clutch may be carried by the driving member and likewise the parts carried by the driving member may carry the parts shown in my drawing attached to the driven member.

It will be understood also, that when my device is used in connection with marine propellers, it will be desirable to vent the housing chamber of the spring in order that when the propeller is disengaged it may have a quick backward movement on the shaft far enough to dis-engage the lugs; in the present instance I have shown the exterior of the nut 10 provided with longitudinal grooves 10¹, these grooves serving to put the interior of the chamber in communication with the outside water, and thus prevent sufficient water being trapped in the spring-chamber to permit quick outward movement of the propeller.

I claim:

1. In a clutch mechanism, a driving shaft having non-rotatably mounted thereon a clutch member provided with recesses in its outer face, a driven clutch member having lugs adapted to enter said recesses, these lugs being provided with cam faces, a spring for normally holding the clutch members in engagement but adapted to yield to release the clutch members when the driven member is abnormally resisted, and a rotatable lockout plate mounted between said members and having holes through which said lugs extend, this plate being positioned so that when said lugs ride out of their companion recesses they will ride onto the outer face of said lock-plate and thus by spring pressure rotate the same so as to cover said recesses and thus prevent re-engagement of the clutch members.

2. The structure recited in claim 1, means being provided whereby said lockout plate is restricted in its rotative movements in both directions, for the purpose set forth.

3. The structure recited in claim 1, means being provided whereby said lockout plate is restricted in its rotative movements in both directions, for the purpose set forth, said means embodying notches formed in the lockout plate at opposite points in its edge and a pair of outwardly projecting lugs carried by the driving member of the clutch.

4. In a clutch mechanism, a driving shaft having non-rotatably mounted thereon a clutch member provided with recesses in its outer face, a driven clutch member having lugs adapted to enter said recesses, these lugs being provided with cam faces, a spring for normally holding the clutch members in engagement but adapted to yield to release the clutch members when the driven member is abnormally resisted, and a freely rotatable lockout-plate mounted between said members and having holes through which said lugs extend, this plate being positioned so that when said lugs ride out of their companion recesses they will engage said lock-plate and thus rotate the same so as to cover said recesses and thereby prevent re-engagement of the clutch members, means being provided for positively arresting the movement of the lockout plate to hole-closing position.

5. In a clutch mechanism, a driving-element carrying a driving clutch-member and a driven clutch-member, these members being provided with inter-engaging elements which when the rotation of the driven clutch-member is abnormally resisted, the clutch-members will separate and dis-engage, said inter-engaging elements embodying lugs on one of the clutch-members and recesses in the other clutch-member, and a movable lockout plate located between the two clutch-members and having holes for the passage of said lugs, so that upon release said lugs will move said lockout plate to cover said recesses and thus prevent re-engagement, means being provided for arresting the movement of the lockout plate in hole closing position.

6. The structure recited in claim 5, means being provided on the driving element for holding said lockout plate against the face of the clutch-member having the holes.

WILLIAM WESTEL WILLOUGHBY.